United States Patent [19]

Morisawa

[11] 3,819,556

[45] June 25, 1974

[54] CORROSION RESISTANT PROCESSING

[75] Inventor: Takao Morisawa, Yokkaichi, Japan

[73] Assignee: Mitsubishi Petrochemical Co., Ltd., Tokyo, Japan

[22] Filed: Aug. 22, 1972

[21] Appl. No.: 282,776

[30] Foreign Application Priority Data
Sept. 30, 1971 Japan.............................. 46-76523

[52] U.S. Cl.. 260/29.6 PS, 106/DIG. 1, 117/123 D, 260/29.6 R, 260/29.6 T, 260/29.7 R, 260/29.7 T
[51] Int. Cl..... C08f 19/10, C08f 41/06, C08f 45/04
[58] Field of Search.... 260/29.6 S, 29.6 PS, 29.6 R; 117/123 D; 106/DIG. 1

[56] References Cited
UNITED STATES PATENTS

| | | | |
|---|---|---|---|
| 2,311,233 | 2/1943 | Jaenicke et al...................... | 260/41 |
| 2,905,566 | 9/1959 | Schmidt.............................. | 106/170 |
| 3,196,122 | 7/1965 | Evans................................. | 260/29.6 |
| 3,257,338 | 6/1966 | Sefton................................. | 260/2.5 |

OTHER PUBLICATIONS

Taylor, W. H., Concrete Technology and Practice, American Elsevier Publishing Co., Inc., (1965), pp. 6–19, 258–262.

Primary Examiner—Melvin Goldstein
Assistant Examiner—Walter Danison
Attorney, Agent, or Firm—Oblon, Fisher, Spivak, McClelland & Maier

[57] ABSTRACT

Non-alkaline aggregate powder is mixed with an emulsion of an acrylic ester resin to form a resin paste containing a high content of aggregate compared with the resin. The paste is used to impart corrosion resistance to concrete, or for filling joints between tiles or bricks, or to form acid resistant shaped articles.

16 Claims, 1 Drawing Figure

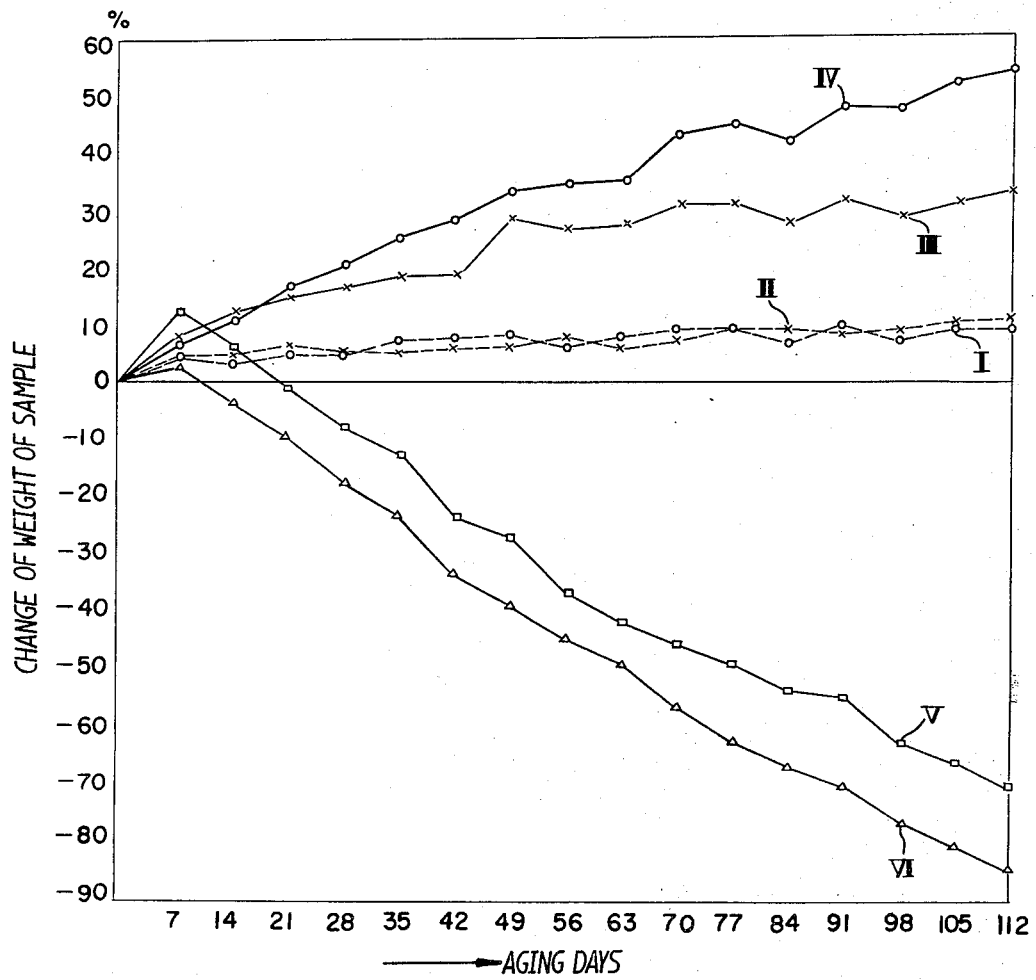

CORROSION RESISTANT PROCESSING

BACKGROUND OF THE INVENTION

1. Field of the Invention

This invention relates to a composition for enhancing the corrosion resistance of concrete and other surfaces or for preparing corrosion resistant shaped articles, and to a process for using said composition. More particularly, this invention relates to a corrosion resistant composition which contains a high content of aggregate and a minor amount of a resin.

2. Description of the Prior Art

Conventional concrete surfaces are corrodible under the influence of strong acids and bases, and hence new concrete surfaces which are intended for environments in which exposure to such corrosive agents is likely, must be protected by suitable covering materials. In the past, it has been customary to cover new cement surfaces with a variety of coatings or other protective coatings. For instance, it is known to protect concrete surfaces by covering with metal plates, such as lead or stainless steel, with resin sheets such as sheets of polyethylene, polypropylene or the like, or to coat the concrete surface with resin mortars containing a resin and an inorganic filler, or with cement mortars containing a resin and cement. It is also known to treat the exposed concrete surfaces with water glass cement or with sulfur cement.

In treating concrete with resin mortar, one method has been to coat the exposed concrete surfaces at the construction site using a paste of a thermosettable resin, such as an epoxy resin, unsaturated polyester resin, polyurethane resin or furan resin with a curing agent and 3 – 5 times by weight of an inorganic aggregate, such as silica sand. The mixture is kneaded to form the mortar and the mortar is coated onto the concrete surface with a metal trowel.

One disadvantage of resin mortars, however, is that they require unacceptably large quantities of resin such that the properties of the resulting mortar too closely resemble those of the cured resin. Moreover, in general, the degree of acid resistance imparted by the mortar coating is dependent upon the quantity of inorganic aggregate contained therein. The higher the inorganic aggregate content, the greater will be the acid resistance.

On the other hand, the larger the quantity of inorganic aggregate, the more difficult is the processability of the mortar, since it is more difficult to uniformly disperse the resin through the aggregate, and the more that other properties of the mortar, such as water permeability, will suffer.

In conventional resin mortar compositions which use a thermosetting resin, therefore, processability has been poor and the content of the inorganic aggregate has been severely limited.

It has been recognized that although cement mortars, which contain a resin and cement admixture, possess excellent bonding properties, their degree of acid resistance is poor and hence the use of cement mortars is severely limited to only specialized applications. It is now considered that the reason for the poor acid resistance of cement mortars is the fact that Porland cement, which contains calcium silicate and calcium aluminate, is an alkaline material which is readily attackable by acids. Although the admixture of the Porland cement with the resin results in some covering of the cement particles with the resin, it is usually not sufficient covering to sufficiently enhance the acid resistance of the mortar.

SUMMARY OF THE INVENTION

Accordingly, it is one object of this invention to provide an acid corrosion resistant mortar which possesses good processability and which is economically attractive to prepare and to use.

It is another object of this invention to provide a corrosion resistant mortar which contains a large content of inorganic aggregate and a small content of resin, which can be uniformly and easily applied to a cement surface.

These and other objects of this invention, as will hereinafter become more readily apparent, have been atained by admixing 2 – 20 parts by weight of a non-alkaline aggregate powder per part of an emulsion of an acrylic ester. This admixture may be applied to a concrete surface or to the joints of bricks or tiles, or for the preparation of corrosion resistant shaped articles.

DETAILED DESCRIPTION OF THE PREFERRED EMBODIMENTS

The composition used in this invention is similar to conventional Portland cement mortars, except that the Portland cement is replaced with a non-alkaline aggregate, and instead of a thermosettable resin, an emulsion of an acrylic ester resin is used.

The chemical and physical properties of this mortar composition are substantially different and superior to conventional resin mortars, in that corrosion resistance is superior, particularly acid corrosion resistance.

Suitable acrylic ester resin emulsions used in this invention are the emulsions of polymers of acrylic ester or the copolymers of acrylic ester and a compatible comonomer, such as styrene, acrylic acid, methacrylic acid, methacrylic ester or a mixture thereof. When a copolymer is used, it is preferable that it contain more than 30 mole percent of acrylic ester. Particularly suitable acrylic ester resins include the polymer and copolymers of methyl acrylate, ethyl acrylate, 2-ethyl-hexyl-acrylate, butyl acrylate, copolymers of acrylic esters, e.g., butylacrylate-styrene, ethylacrylate-styrene, butylacrylate-methylmethacrylate; copolymers of butylacrylate and rubber, e.g., butylacrylate-styrene-butadiene rubber, acrylonitrile-butadiene rubber, or mixtures thereof.

The types of emulsifier or surfactant for the acrylic ester resin are: (a) nonionic surfactant and (b) a mixture of main component of nonionic surfactant and additional component of anionic surfactant. The polymerization degree of the acrylic ester is preferably in the range of 50,000 – 100,000 by measuring by the limiting viscosity method. The viscosity of the emulsion of the acrylic ester is preferably 10 – 30 cp.

The acrylic ester resin emulsions are characterized by a high affinity to concrete and to non-alkaline aggregate and when dried is highly water resistant and highly acid resistant. The acrylic ester resin emulsion should be characterized by high mechanical stability and should be easily dispersible into the aggregate. The solid concentration of the emulsion is preferably in the range of about 10 – 60 percent by weight and especially 40 – 50 percent by weight. The particle size of the emulsion is preferably in the range of $0.1 - 10\mu$, especially 0.1 – 0.3μ average diameter. Suitable non-alkaline aggregates used in this invention are the inorganic aggregate powders which contain a major portion of silica or alumina, and which do not contain any alkaline components. Exemplary of these aggregates are fly ash, silica sand, porcelain powder, diatomaceous earth, blast furnace slag, volcanic pumice and the like. Especially suitable as fly ash, blast furnace slag and volcanic pumice, particularly when admixed with silica sand. It is preferable for the aggregate to have a sine curve particle size distribution to form the highest density fill condition.

The predominant amount of the aggregate should have a particle size of preferably greater than 3μ, and especially greater than 50μ. More than 10 percent by weight of the aggregate should have a particle size of less than 50μ. When a large percentage of fine particles are present, the overall content of aggregate must be low, because the coatability of the mortar containing the aggregate will be decreased. Accordingly, there should not be an excess of aggregate having a particle size of less than 3μ.

The aggregate should be present in an amount of 2 – 20 times that of acrylic ester resin.

Admixing of the aggregate with the acrylic ester resin emulsion can be carried out by a conventional mixer. The order to feed into the mixer is not critical, although it is preferred to feed the aggregate powder to the mixer first and then to feed in the emulsion, while stirring. Of course, both the aggregate and the emulsion can be fed into the mixer in small proportions simultaneously or the aggregate powder can be fed into the emulsion. The resulting admixed composition can be used to coat concrete surfaces to provide enhanced acid corrosion resistance. This technique will find application in improving acid resistant coating within concrete tubes or concrete vessels, or for filling joints between tiles or bricks, or to form acid resistant shaped articles.

The following are exemplary of the method of using the present composition:

1. Coating:

2 parts of an aggregate (1.5 parts of fly ash and 0.5 part of silica sand) was admixed per part of an emulsion of a copolymer of butyl acrylate-styrene (70 mole percent of butyl acrylate content) which had a viscosity of 15 – 30 cp, a particle size of 0.1 – 0.3μ, and a resin component of 40 percent. The mixture was kneaded to form a paste and the paste was coated onto a concrete base by use of a trowel or brush in a thickness of 2 – 3 mm. It was then dried.

2. Joint Filling:

5 parts of an aggregate powder (3 parts of fly ash and 2 parts of silica sand) were admixed per 1 part of an emulsion of a copolymer of butyl acrylate-styrene (50 mole percent of butyl acrylate content) to form a high viscosity mortar paste. The mortar paste was filled into the joints between tiles or bricks by pressing with a trowel.

3. Molding:

8 parts of an aggregate powder (4 parts of fly ash and 4 parts of silica sand) were admixed per part of the emulsion of Example 1 below. The mixture was kneaded and a high viscosity paste mortar was fed into a mold and was pressed-shaped. The processing was suitable for producing an acid resistant U-shaped ditch groove.

The composition finishes off very nicely by heating at a drying temperature.

The aggregate powder can be uniformly admixed with the resin component so as to impart a suitable degree of fluidity as required for processing so as to provide remarkably improved processing operation. Moreover, since the resin content is comparatively slight, it can only be concluded that the combination of the resin and aggregate provide synergistic results in terms of enhanced properties. For example, if a film having a thickness of 1 mm., prepared from an emulsion of an acrylic ester resin is immersed in 98% $H_2SO_4$, the film will be decomposed within several hours. However, under the same conditions, except using the composition of this invention, no visible change was observed even after being immersed in 94% $H_2SO_4$ for 24 hours. For further example, although epoxy resin cured resinous mortar is considered to be highly acid resistant, a 2 – 3 mm. thickness layer of the mortar will be dissolved by immersion in 98% $H_2SO_4$ for 24 hours.

The reason for the improved results attained by the present composition seems to be that permeation of the acid to the surface of the aggregate, such as silica and alumina, etc., is prevented by the resin coating.

The acid resistance of the composition of this invention will be compared with that of conventional coatings. The emulsion of the acrylic ester adhesive used in the Examples was an aqueous emulsion of a copolymer of butyl acrylate-styrene (70 mole percent of butyl acrylate) having a 40 percent by weight resin content.

Having now generally described the invention, a further understanding can be obtained by reference to the following specific examples which are provided herein for purposes of illustration only and which are not intended to be limiting in any manner unless otherwise specified.

EXAMPLE 1

Coating onto concrete surface:

| | |
|---|---|
| Dispersion of butyl acrylate adhesive (40% by weight of resin content) | 1 part |
| Fly ash | 1.5 part |
| Silica sand | 0.5 part |

The above ingredients were admixed and kneaded to form an acid resistant paste and the paste was brush coated onto a concrete surface and dried for 1 – 2 hours. Coating and drying were repeated 3 times. No change in the coated layers was observed even upon contact with a 2 percent $H_2SO_4$ solution.

EXAMPLE 2

Filling joints between bricks:

| | |
|---|---|
| Dispersion of butyl acrylate adhesive (40 % by weight of resin content) | 1 part |
| Fly ash | 3 parts |
| Silica sand | 2 parts |

The above ingredients were admixed and kneaded to form a highly viscous, acid resistant paste. Acid resistant bricks were laid using this paste as a joint filler. No change in the acid resistant mortar was observed, even after contact with a 25 percent $H_2SO_4$ solution.

EXAMPLE 3

Treating molded articles:

| | |
|---|---|
| Dispersion of copolymer of butyl acrylate-styrene adhesive (40% by weight of resin content) | 1 part |
| Fly ash | 4 parts |
| Silica sand | 5 parts |

The above ingredients were admixed and kneaded to form a highly viscous paste. The paste was filled in a U-shape mold and the mold was vibrated and pressed to shape. After 24 days, the product was removed from the mold and was air dried for 3 days. A U-shaped groove ditch was formed on the product and the ditch was filled with 25% $H_2SO_4$. No change was observed.

Comparative acid resistance tests were carried out. The tested compositions are shown in the following table:

| | Composition | | | | | |
|---|---|---|---|---|---|---|
| | I | II | III | IV | V | VI |
| Emulsion of butyl acrylate adhesive (40% resin component) | 1 | 1 | 1 | 1 | 0 | 0 |
| Fly ash | 4 | 4 | 0 | 0 | 0 | 0 |
| Portland cement | 0 | 0 | 4 | 4 | 2 | 1 |
| Silica sand | 5 | 2 | 8 | 2 | 1 | 2 |

The sample was prepared by admixing and kneading the above ingredients and then a shaped product 4 × 4 × 16 cm in size, was formed in accordance with the process of Example 3. Compositions I and II were those of this invention. The other four compositions were used as references, wherein the compositions III and IV are resin-cement mortars and compositions V and VI are conventional mortars.

In the acid resistant tests, 25% $H_2SO_4$ was used and samples prepared from the compositions I, II, III, IV, V and VI were placed into a stream of the acid. The weight of each sample was measured over a period of 112 days.

The results of the acid resistance tests are shown in the Drawing. The samples of this invention (I, II) were found not to be deteriorated even after contact with the acid over an extended period of time. However, samples prepared from the resin-cement (III, IV) absorbed the sulfuric acid and increased in weight and were deteriorated. The samples prepared from the cement mortar (V, VI) were corroded by the sulfuric acid and a loss in weight was detected.

EXAMPLE 4

| | |
|---|---|
| Butyl acrylate-methylmethacrylate emulsion (Resin content 50%) | 1 part |
| Fly ash | 3 parts |
| Silica sand | 2% |

The above ingredients were admixed and kneaded to form paste. The paste was coated on a surface of concrete by a brush. The coating was repeated for five times after drying the coated one.

No change in the coated mortar was observed, even after contact with the following solutions.
1. 10% acetic acid aqueous solution
2. 2% HCl solution
3. 2% $H_2SO_4$ solution.

Having now fully described the invention, it will be apparent to one of ordinary skill in the art that many changes and modifications can be made thereto without departing from the spirit or scope of the invention.

Accordingly, what is claimed and intended to be covered by Letters Patent is:

1. A corrosion resistant mortar consisting essentially of an admixture of a non-alkaline aggragate of silica sand and fly ash, and an acrylic ester resin aqueous emulsion, wherein the aggregate is present in an amount of 2-20 times that of the acrylic ester resin, wherein the acrylic ester resin is selected from the group of resins consisting of methyl acrylate, ethyl acrylate, 2-ethyl-hexyl acrylate, butyl acrylate, butyl acrylate-styrene, ethyl acrylate-styrene, butyl acrylate-methylmethacrylate, butylacrylate-styrene-butadiene rubber, acrylonitrile-butadiene rubber, and mixtures thereof, wherein at least 30 percent by weight of the resin is an acrylate.

2. The mortar of claim 1, wherein the acrylic ester resin is a copolymer resin selected from the group consisting of butylacrylate-styrene, ethylacrylate-styrene, butylacrylate-methylmethacrylate, butylacrylate-styrene-butadiene rubber, acrylonitrile-butadiene rubber, and mixtures thereof, wherein at least 30 percent by weight of the copolymer is an acrylate.

3. The mortar of claim 1, wherein the acrylic ester resin has a degree of polymerization in the range of 50,000 - 100,000.

4. The mortar of claim 1, wherein the acrylic ester resin emulsion has a solid concentration of about 10 - 60 percent by weight and a particle size in the range of 0.1 - 10$\mu$.

5. The mortar of claim 1, wherein the acrylic ester resin emulsion is an aqueous emulsion of a copolymer of butylacrylate-styrene, the butylacrylate being present in an amount of 70 mole % and the emulsion having a solid concentration of 40 percent by weight.

6. The mortar of claim 1, wherein the aggragate has an average particle size of greater than 3$\mu$.

7. The mortar of claim 1, wherein the silica sand has an average particle size of greater than 50$\mu$ and the fly ash has an average particle size of more than 3$\mu$, in which more than 10 percent by weight of the aggragate has an average particle size of less than 50$\mu$.

8. The mortar of claim 1, which consists of fly ash, silica sand, and an emulsion of butylacrylate-styrene.

9. The mortar of claim 1, wherein the admixture contains 9 parts of non-alkaline aggragate per part of acrylic ester resin emulsion.

10. The mortar of claim 1, wherein the admixture contains 6 parts of non-alkaline aggragate per part of acrylic ester resin.

11. The mortar of claim 4, wherein the solid concentration of the emulsion is within the range of 40 - 50 percent by weight and has a particle size in the range of 0.1 - 0.3$\mu$.

12. The mortar of claim 9, wherein the non-alkaline aggragate consists of 4 parts fly ash to 5 parts silica sand.

13. The mortar of claim 10, wherein the non-alkaline aggragate consists 4 parts of fly ash to 2 parts of silica sand.

14. The mortar of claim 1, wherein the acrylic ester resin used in said emulsion is a polymer or copolymer containing methyl acrylate, ethyl acrylate, 2-ethylhexyl acrylate or butyl acrylate, and wherein at least 30 percent by weight of said polymer or copolymer is an acrylate.

15. A process for forming a corrosion resistant paste which comprises: forming a mixture of a non-alkaline aggregate of silica sand and fly ash and an acrylic ester resin aqueous emulsion, wherein the aggregate is present is an amount of 2–20 times that of the acrylic ester resin and, kneading said mixture to form a paste.

16. The process of claim 15, wherein said paste is molded into a shaped article and dried.

* * * * *